United States Patent [19]

Nakai et al.

[11] Patent Number: 5,728,798
[45] Date of Patent: Mar. 17, 1998

[54] PROCESS FOR PREPARING POLYACETAL COPOLYMER

[75] Inventors: Akira Nakai; Kaoru Yamamoto, both of Shizuoka, Japan

[73] Assignee: Polyplastics Co., Ltd., Japan

[21] Appl. No.: 809,046

[22] PCT Filed: Jul. 11, 1996

[86] PCT No.: PCT/JP96/01933

§ 371 Date: Mar. 7, 1997

§ 102(e) Date: Mar. 7, 1997

[87] PCT Pub. No.: WO97/03100

PCT Pub. Date: Jan. 30, 1997

[30] Foreign Application Priority Data

Jul. 13, 1995 [JP] Japan .................. 7-177225

[51] Int. Cl.$^6$ ........................... C08G 2/10
[52] U.S. Cl. .......... 528/230; 528/234; 528/235; 528/237; 528/241; 528/242; 528/245; 528/249; 528/250; 528/270; 528/392
[58] Field of Search ............ 528/230, 234, 528/235, 237, 241, 242, 245, 249, 250, 270, 392

[56] References Cited

U.S. PATENT DOCUMENTS 4,956,445  9/1990  Yamamoto et al. ............ 528/230

FOREIGN PATENT DOCUMENTS 62-79223   4/1987  Japan .
1-170610   7/1989  Japan .
7-37504    4/1995  Japan .

*Primary Examiner*—Frederick Krass
*Attorney, Agent, or Firm*—Nixon & Vanderhye P.C.

[57] ABSTRACT

In preparing a polyacetal copolymer through copolymerization of trioxane as the principal monomer with a cyclic ether or cyclic formal having at least one carbon-carbon bond as the comonomer, 0.05 to 100 ppm (on the weight basis), based on the total amount of the monomers, of a heteropolyacid or an acidic salt thereof is used as a polymerization catalyst, and a liquid mixture preliminarily prepared by mixing at least part or the whole of the comonomer with the polymerization catalyst is added to trioxane to effect copolymerization. According to such the process, the polymerization yield and the degree of polymerization (molecular weight) are enhanced, and a polyacetal copolymer having an improved stability can be obtained.

4 Claims, No Drawings

PROCESS FOR PREPARING POLYACETAL COPOLYMER

BACKGROUND OF THE INVENTION

1. Field of the Invention

The present invention relates to a process for producing a polyacetal copolymer. In particular, it relates to an improved, novel process for copolymerizing trioxane as the principal monomer with a cyclic ether or a cyclic acetal as the comonomer to produce a polyacetal copolymer.

2. Description of the Related Art

Processes for producing polyacetal copolymers have so far been known. In particular, copolymerization of trioxane as the principal monomer with a cyclic ether or cyclic formal having two or more vicinal carbon atoms as the comonomer is known. In general, cationic catalysts are used as catalysts for these copolymerizations, and specific examples thereof include Lewis acids such as halides of boron, tin, titanium, phosphorus, arsenic and antimony, e.g., boron trifluoride, tin tetrachloride, titanium tetrachloride, phosphorus pentachloride, phosphorus pentafluoride, arsenic pentafluoride and antimony pentafluoride, and compounds such as complexes or salts of them; protonic acids such as perchloric acid; protonic acid esters such as esters of perchloric acid with lower aliphatic alcohols, e.g., tert-butyl perchlorate; protonic acid anhydrides such as mixed acid anhydrides of perchloric acid and lower aliphatic carboxylic acids, e.g., acetyl perchlorate; and trimethyloxonium hexafluorophosphate, triphenylmethyl hexafluoroarsenate, acetyl tetrafluoroborate, acetyl hexafluorophosphate and acetyl hexafluoroarsenate. Among them, boron fluoride and coordinate compounds of boron fluoride with organic compounds such as ethers are the most conventional as catalysts for copolymerizing trioxane as the principal monomer with a comonomer and widely used industrially.

However, there have been problematic that conventionally used polymerization catalysts such as boron fluoride series compounds are required in relatively large quantities (for example, 40 ppm or more based on the whole monomers), that the polymerization degrees of the resulting polymers are limited, and that the resulting polymers contain unstable terminal moieties in considerable amounts which requires a complicated step for stabilization thereof.

The present inventors have found that it is very effective to use a heteropoly-acid or an acidic salt thereof as a polymerization catalyst for solving such the problems as described above. By using the heteropoly-acid or the acidic salt thereof in a very small amount, the copolymerization can be further easily conducted to give, at a high yield, a copolymer having a high degree of polymerization and unstable ends in a small amount (see Japanese Patent Publication-A No. 1-170610 and Japanese Patent Publication-B No. 7-35704).

However, since heteropoly-acid series polymerization catalysts are solid in themselves, it has to be added in the form of a liquid prepared by dissolving or dispersing it in a diluent in order to conduct the polymerization uniformly. Ethers such as n-butyl ether are used as the diluent, since they are inert to the copolymerization and therefore exert no adverse effects on the copolymerization, and can dissolve the heteropoly-acid or the acidic salt thereof. However, there have been problematic as yet that ethers can dissolve the heteropoly-acid or the acidic salt thereof unsufficiently to be required considerable amounts and that the diluents contaminate the copolymer.

DISCLOSURE OF THE INVENTION

3. Summary of the Invention

An object of the present invention is to provide a process for producing a polyacetal copolymer in which the preceding problems involved in the conventional copolymerization of trioxane with a comonomer in the presence of the heteropoly-acid series catalyst are solved, and further by which a polymerization yield, and a degree of polymerization (molecular weight) and stability of the resulting copolymer are improved.

Thus, the present invention is a process for preparing a polyacetal copolymer through copolymerization of trioxane as the principal monomer with a cyclic ether or cyclic formal having at least one carbon-carbon bond as the comonomer, characterized in that 0.05 to 100 ppm (on the weight basis), based on the total amount of the monomers, of a heteropoly-acid represented by the following formula (1) or an acidic salt thereof is used as the polymerization catalyst, and that a liquid mixture preliminarily prepared by mixing at least part or the whole of said comonomer with said polymerization catalyst is added to trioxane to effect copolymerization:

  (1)

wherein M represents one or two kinds of central elements selected from among P and Si; M' represents at least one kind of coordinating element selected from among W, Mo, and V; l is 10 to 100; m is 1 to 10; n is 8 to 40; x is an integer of at least 1; and y is 0 to 50.

In other words, the present invention relates to a process for preparing a polyacetal copolymer which comprises copolymerizing trioxane as the principal monomer with a cyclic ether or cyclic formal having at least one carbon-carbon bond as the comonomer while adding a liquid mixture comprising a part or the whole of said comonomer with 0.05 to 100 ppm (on the weight basis), based on the total amount of the monomers, of a heteropoly-acid represented by the following formula (1) or an acidic salt thereof as the polymerization catalyst to trioxane:

  (1)

wherein l is 10 to 100; m is 1 to 10; n is 6 to 40; x is an integer of at least 1; y is 0 to 50; M represents P or Si as the central element, with the proviso that when m is 2 or above, Ms may be the same or different from one another; and M's may be the same or different from one another and each represents W, Mo or V as the coordinating element.

The present invention is characterized in that a solution preliminarily prepared by dissolving a heteropoly-acid or an acidic salt thereof as the copolymerization catalyst in at least a part, preferably all of a comonomer(s) for copolymerization is used, and that this solution is added to and mixed in trioxane which is a principal monomer and is maintained at a suitable temperature for polymerization. That is, the comonomer is used also as a diluent (or solvent) for dissolving the catalyst in the present invention. Employment of such a means not only makes it easy to prepare a catalyst solution and prevents a problem of an impurity caused by using other solvent, but also, to be unexpected, further enhances the activity of the catalyst to the copolymerization and can reduce the amount of the catalyst to be used. Furthermore, the effects of the enhancements in the polymerization yield and in the polymerization degree (molecular weight) and the reduction in the unstable ends of the resulting copolymer (i.e., the improvement in stability) have been confirmed.

The present invention will now be described in detail.

DETAILED DESCRIPTION OF THE INVENTION

The "heteropoly-acid" as a copolymerization catalyst, by which the present invention is characterized, is a generic term for polyacids which are formed by condensing by dehydration two or more kind of oxygen acids one another. The heteropoly-acid contains a mono- or polynuclear complex ion wherein a specific hereto element is present in the center thereof and the oxygen acid residues are bonded one another through oxygen atoms. Such a heteropoly-acid can be usually represented by the formula (1) described above.

In the heteropoly-acid which is particularly effective as the copolymerization catalyst of the present invention, the central element (M) in the composition formula described above is composed of one or two kinds of elements selected from among P and Si, and the coordinate element (M') is composed of at least one element selected from among W, Mo and V, particularly preferably W or Mo.

Further, acidic salts of heteropoly-acids each having a form, in which any of various metals substitutes for a part of H's (hydrogen atoms) in the formula (1), can also be used as the catalyst of the present invention.

Specific examples of these heteropoly-acids include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid and silicomolybdotungstovanadic acid. Among them, preferred are silicomolybdic acid, silicotungstic acid, phosphomolybdic acid and phosphotungstic acid.

The amount of the heteropoly-acid or the acidic salt thereof used as a polymerization catalyst for monomers comprising mainly trioxane is varied depending on the kind thereof and can suitably be changed to control the polymerization. In general, it falls in a range of from 0.05 to 100 ppm, preferably from 0.1 to 50 ppm based on the total amount of the monomers to be polymerized. The use amount of preferably 0.1 to 10 ppm suffices heteropoly-acids acting very strongly such as phosphomolybdic acid, phosphotungstic acid, silicomolybdic acid and silicotungstic acid. The copolymerization which can be carried out with the catalyst in such the small amount is effective for reducing undesirable reactions such as breakage of the principal chain of the copolymer and depolymerization caused by the catalyst to narrow ranges, and advantageous from an economical viewpoint.

The cyclic ether or cyclic formal which is a comonomer component and is used as a diluent for the catalyst in the present invention is a cyclic compound having at least one carbon-carbon bond represented by the following formula (2):

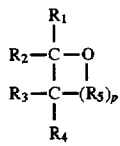

(2)

wherein $R_1$, $R_2$, $R_3$ and $R_4$ may be the same or different from one another and each represents a hydrogen atom, an alkyl group having 1 to 5 carbon atoms or a halogen-substituted alkyl group having 1 to 5 carbon atoms; p represents an integer of 0 to 3; and $R_5$ represents a methylene or oxymethylene group optionally having an alkyl group or a halogenated alkyl group as a substituent; or alternatively $R_5$ represents a divalent group represented by the formula: —$(CH_2)_qOCH_2$— or —$(O—CH_2—CH_2)_qOCH_2$— (wherein q represents an integer of 1 to 4), with the proviso that p is 1.

The representative examples of such cyclic ethers and cyclic formals include 1,3-dioxolane, diethylene glycol formal, 1,4-butanediol formal, 1,3-dioxane, 1,3,5-trioxepane, ethylene oxide and propylene oxide. Among them, cyclic formals such as dioxolane, diethylene glycol formal and 1,4-butanediol formal are preferably used as the comonomer and as the diluent for the polymerization catalyst. The cyclic ether or cyclic formal used as the diluent for the polymerization catalyst is introduced into the principal chain of the resulting copolymer to constitute its copolymer unit. In the present invention, the diluent for the polymerization catalyst becomes a constitutional component of the resulting copolymer, and no solvent for the polymerization catalyst has to be specially used unlike the conventional processes. Therefore, not only no problem of impurity is caused and economical advantages are provided, but also various unexpected effects described above are brought about.

The cyclic ether or cyclic formal as the comonomer in the present invention is used in an amount of 0.1 to 20% by mole, preferably 0.2 to 10% by mole based on the molar amount of trioxane. When the amount is less than 0.1% by mole, the unstable ends are increased to deteriorate the stability. While when it exceeds 20% by mole, the resulting copolymer is soft and has a lower melting point, unfavorably.

A part of the comonomer required for preparing the copolymer may be used as the diluent for the catalyst, and the balance may be preliminarily mixed with trioxane as the principal monomer. However, in order to smoothly conduct the polymerization and sufficiently attain the effects of the present invention, it is preferable that the catalyst is sufficiently diluted, and that, from this viewpoint, the entire amount of the comonomer required for the copolymerization is used as the diluent for the catalyst. It is concerned that the preliminary mixing of the catalyst with the comonomer might causes homopolymerization of the comonomer. However, even if the catalyst is preliminarily mixed with the comonomer, the solution can be maintained as a stable and uniform one without causing the homopolymerization of the comonomer, by dissolving the heteropoly-acid or the acidic salt thereof in the comonomer at a relatively low temperature and maintaining the resulting solution at a low temperature, for example, at least room temperatures or lower, preferably 0° C. or lower, until immediately before adding it to the polymerization system. Such the solution is added to and mixed with trioxane at a temperature of 60° C. or above to start the copolymerization, and then the copolymerization is smoothly and promptly advanced, whereby an uniform copolymer can be prepared at a high yield.

In the copolymerization of the present invention, a known chain transfer agent, for example, a linear acetal having a low molecular weight such as methylal can be added, if necessary, to trioxane or the comonomer in a suitable amount to suitably control the polymerization degree of the resulting copolymer to a desired value. It is preferable that the copolymerization system resides in the state that impurities such as water, alcohols and acids are not substantially present.

The copolymerization of the present invention can be conducted in the similar facilities and processes as those for conventional copolymerizations using trioxane as the principal monomer. That is, either a batch system or a continuous system can be applied, wherein a mixed solution of a catalyst and a comonomer is prepared to be desired amounts of the comonomer and the catalyst, and then is added to trioxane which has been preliminarily controlled at a temperature (65° to 120° C.) suitable for the copolymerization, and the resulting solution is stirred at a desired temperature for copolymerization to prepare a copolymer in the form of a solid powdery lumb. The catalyst solution (comonomer) may be divided into two or more parts and each may be added thereto.

The polymerization time is related to the amount of the catalyst and is not specifically restricted. In general, the polymerization time of 0.5 to 100 minutes is selected.

With respect to a polymerization apparatus used in the present invention, a reactor equipped with a stirrer usually employed can be used for a batch system, while for a continuous system, continuous polymerization apparatuses for trioxane which have so far been proposed, such as a cokneader, a biaxial screw type continuous extruding-mixer, a biaxial paddle type continuous mixer and others, can be used. Further, two or more types of the polymerization equipments can be used in combination.

It is preferable that preferably ammonia, usually any of amines such as triethylamine, tri-n-butylamine and hindered amines, oxides, hydroxides and organic acid salts (for example, fatty acid salts) of alkaline metals and alkaline earth metals, and other known catalyst deactivators, or alternatively a solution containing any of these deactivators is added to and mixed with the reaction system after the completion of the polymerization to treat the polymerization catalyst, thereby neutralizing and deactivating the catalyst. It is a matter of course that when the resulting copolymer is in the form of a large lump, it is preferably once pulverized and then treated.

The copolymer thus obtained is further subjected to a stabilizing treatment, if necessary. The stabilizing treatment is achieved by subjecting the copolymer to the heating and melting treatment, or by heating the copolymer in a liquid medium in which the copolymer is insoluble or soluble to thereby selectively decompose and eliminate the unstable moieties. Particularly in the case of the present invention, unstable moieties are present in a small amount in the stage of the completion of the copolymerization, as compared with those prepared by conventional processes, and therefore the stabilization can be extremely simplified. The stabilization can be attained by melting and extruding the copolymer in the presence of a prescribed stabilizer to pelletize it. Thus, a copolymer having a high stability can be provided as a final product.

As apparent from the explanations given above, by preliminarily preparing a catalyst solution by diluting a specific catalyst with a comonomer(s) and subjecting the solution to the copolymerization, various problems caused by using a diluent for catalysts other than the comonomer(s) can be prevented in the present invention, unlike the conventional processes, a high polymerization yield can be attained in a short time by using the catalyst in a small amount, and the copolymer thus obtained has a higher molecular weight. Further, the present invention has such advantages that a copolymer having unstable moieties in a small amount can be obtained by the reduction of the amount of the catalyst, which makes the steps after the copolymerization, such as a stabilization step, possible to extremely simplify, and that a polyacetal copolymer excellent in stability can be obtained.

EXAMPLES

Examples of the present invention and comparative examples will now be described, though the present invention is not restricted thereto. The terms and the determination methods shown in the examples are defined as follows:

% and ppm: all are shown on the basis of weight.
Polymerization yield: the ratio (% by weight) of the amount of the copolymer obtained to the entire amount of the monomers supplied.

Melt index (MI):

Melt indexes (g/10 min) determined at 190° C. are shown. The melt index was evaluated as the characteristic value corresponding to the molecular weight of the copolymer. That is, the lower the the higher the molecular weight. In the determination of the melt index, a small amount of a certain stabilizer was added to the copolymer in order to prevent the decomposition thereof during the determination.

Decomposition ratio with an alkali (amount of the unstable moieties):

The copolymer (1 g) was put in 100ml of a 504 aqueous methanol solution containing 0.54 of ammonium hydroxide and the resulting mixture was heated at 180° C. for 45 minutes in a sealed vessel. Then, the amount of formaldehyde formed by the decomposition of the copolymer and dissolved in the solution was determined. The ratio (% by weight) of the amount of the formaldehyde to the amount of the copolymer is shown below.

weight-loss ratio on heating:

The copolymer (5 g) was pulverized and mixed throughly with a powdery stabilizer mixture comprising 2,2-methylenebis(4-methyl-6-t-butylphenol) (0.5% by weight based on the copolymer) and dicyandiamide (0.1% by weight based on the copolymer). Then, the resulting mixture was heated at 230° C. for 45 minutes in the air. The weight loss ratio on heating was determined.

Examples 1 to 9

The heteropoly-acid catalysts shown in Table 1 were preliminarily dissolved in the comonomers shown in Table 1 to prepare the catalyst solutions (0° C.). On the other hand, trioxane was put into a sealed autoclave having a jacket which a heat medium can pass through and stirring blades, and the inner temperature was maintained at about 70° C. while stirring. Then, each of the catalyst solutions described above was added to the trioxane in the amount shown in Table 1 to start the polymerization. After 3 minutes, a 0.1% aqueous ammonia (about twice the resulting copolymer) was added to the resulting copolymer to terminate the reaction, and the copolymer was pulverized to have a size of 200 mesh or less, simultaneously. Then, the pulverized copolymer was washed with acetone and dried. The polymerization yield, MI, decomposition ratio with an alkali and weight-loss ratio on heating of the resulting copolymer were determined. The results are shown in Table 1.

Comparative Examples 1 to 6

The same reactor as that used in examples 1 to 9 described above was used. Each of the comonomers shown in Table 1 was preliminarily mixed with and dissolved in trioxane, and the resulting solutions were maintained at 70° C. Then, each of the catalyst solutions prepared by dissolving the heteropoly-acid catalysts in di-n-butyl ether was added thereto to conduct copolymerization in the same manner as that in examples 1 to 9. The results are shown in Table 1 together therewith (Comparative Examples 1 to 5).

It was attempted that boron trifluoride used as the catalyst was mixed and diluted with the comonomer. However, the comonomer itself was polymerized, and therefore a stable catalyst solution could not be obtained (Comparative Example 6).

TABLE 1

|  | Catalyst and its amount (ppm based on the entire amount of the monomers) | Diluent for the catalyst | Comonomer and its amount (% based on the entire amount of the monomers) | Polymerization yield (% based on the entire amount of the monomers) | Properties of the copolymer | | |
|---|---|---|---|---|---|---|---|
|  |  |  |  |  | MI (g/10 min) | Decomposition ratio with alkali (%) | Weight-loss ratio on heating (%) |
| Ex. 1 | phosphomolybdic acid (2) | used the comonomer | 1,3-dioxolane (3.5) | 80 | 4.7 | 3.0 | 3.0 |
| Ex. 2 | phosphomolybdic acid (4) | used the comonomer | 1,3-dioxolane (3.5) | 84 | 4.8 | 3.1 | 3.1 |
| Ex. 3 | phosphomolybdic acid (6) | used the comonomer | 1,3-dioxolane (3.5) | 86 | 5.0 | 3.3 | 3.3 |
| Ex. 4 | silicotungstic acid (2) | used the comonomer | 1,3-dioxolane (3.5) | 78 | 4.9 | 3.1 | 3.1 |
| Ex. 5 | silicomolybdic acid (3) | used the comonomer | 1,3-dioxolane (3.5) | 82 | 5.1 | 3.1 | 3.2 |
| Ex. 6 | phosphotungstic acid (8) | used the comonomer | 1,3-dioxolane (3.5) | 85 | 5.2 | 3.3 | 3.5 |
| Ex. 7 | silicovanadic acid (10) | used the comonomer | 1,3-dioxolane (3.5) | 79 | 5.4 | 3.4 | 3.4 |
| Ex. 8 | phosphomolybdic acid (2) | used the comonomer | 1,4-butanediol formal (3.5) | 78 | 4.8 | 3.0 | 3.1 |
| Ex. 9 | phosphomolybdic acid (2) | used the comonomer | diethylene glycol formal (3.5) | 76 | 5.0 | 3.0 | 3.2 |
| Comp. Ex. 1 | phosphomolybdic acid (2) | di-n-butyl ether | 1,3-dioxolane (3.5) | 72 | 5.5 | 4.5 | 4.6 |
| Comp. Ex. 2 | silicotungstic acid (2) | di-n-butyl ether | 1,3-dioxolane (3.5) | 70 | 5.5 | 4.7 | 4.7 |
| Comp. Ex. 3 | phosphomolybdic acid (2) | di-n-butyl ether | 1,4-butanediol formal (3.5) | 70 | 5.7 | 4.8 | 4.1 |
| Comp. Ex. 4 | phosphomolybdic acid (2) | di-n-butyl ether | diethylene glycol formal (3.5) | 68 | 6.0 | 5.0 | 4.9 |
| Comp. Ex. 5 | boron trifluoride (40) | di-n-butyl ether | 1,3-dioxolane (3.5) | 64 | 8.3 | 7.2 | 7.5 |
| Comp. Ex. 6 | boron trifluoride (40) | used the comonomer | 1,3-dioxolane (3.5) | (55) | (9.5) | (8.5) | (9.0) |

Examples 10 and 11 and Comparative Examples 7 to 9

A continuous type mixing reactor comprising a barrel having a cross section formed by partially overlapping two circles and equipped with a jacket for passing a heat medium therethrough at an outside thereof, and two shafts, present inside of the barrel, equipped with a lot of paddles which engage each other, was used. Warm water at 80° C. was passed through the jacket, and the two shafts were rotated at a uniform rate in directions different from each other. Trioxane was continuously fed thereinto through one end thereof at a uniform rate, and each of the same comonomer solutions of the catalysts as those prepared in the above examples was continuously added thereto at a little downstream therefrom to be the prescribed concentration, thereby conducting copolymerization. The reaction mixture discharged from the other end of the barrel was immediately thrown into a 0.1% aqueous triethylamine solution to deactivate the polymerization catalyst, and then the resulting copolymer was dried. The properties of the resulting copolymers are shown in Table 2 (Examples 10 and 11).

For comparison, instead of diluting the catalysts with the comonomers and adding the resulting solutions, the mixture of trioxane and the comonomer was preliminarily prepared and fed into the continuous reactor, and the heteropoly-acid catalyst or the boron trifluoride catalyst diluted with di-n-butyl ether was fed thereinto to conduct similarly the continuous copolymerization and post-treatment. The resulting copolymer was evaluated in the similar manners as those described above (Comparative Examples 7, 8 and 9). The results are shown in Table 2 together therewith.

TABLE 2

|  | Catalyst and its amount (ppm based on the entire amount of the monomers) | Diluent for the catalyst | Comonomer and its amount (% based on the entire amount of the monomers) | Polymerization yield (% based on the entire amount of the monomers) | Properties of the copolymer | | |
|---|---|---|---|---|---|---|---|
|  |  |  |  |  | MI (g/10 min) | Decomposition ratio with alkali (%) | Weight-loss ratio on heating (%) |
| Ex. 10 | phosphomolybdic acid (2) | used the comonomer | 1,3-dioxolane (3.5) | 85 | 3.5 | 1.8 | 1.9 |
| Ex. 11 | phosphotungstic acid (4) | used the comonomer | 1,3-dioxolane (3.5) | 86 | 3.6 | 1.9 | 1.9 |
| Comp. Ex. 7 | phosphomolybdic acid (2) | di-n-butyl ether | 1,3-dioxolane (3.5) | 77 | 4.6 | 2.2 | 2.3 |
| Comp. Ex. 8 | phosphotungstic acid (4) | di-n-butyl ether | 1,3-dioxolane (3.5) | 76 | 4.7 | 2.3 | 2.3 |
| Comp. Ex. 9 | boron trifluoride (40) | di-n-butyl ether | 1,3-dioxolane (3,5) | 70 | 6.6 | 3.8 | 4.1 |

We claim:

1. A process for preparing a polyacetal copolymer by copolymerization of trioxane as a principal monomer with a cyclic ether or cyclic formal having at least one carbon-carbon bond as a comonomer, comprising the steps of:

(a) forming a liquid prepolymerization mixture comprised of at least a part or the entirety of said comonomer with between 0.05 to 100 ppm, based on the total weight of the monomers, of a heteropoly-acid polymerization catalyst or an acid salt thereof according to the following formula:

wherein M represents an element selected from the group consisting of P and Si; M' represents a coordinating element selected from W, Mo or V; l is 10 to 100;

m is 1 to 10; n is 6 to 40; x is an integer of at least 1; and y is 0 to 50;

(b) introducing the prepolymerization mixture with the principal monomer; and thereafter (c) conducting copolymerization of the prepolymerization mixture and the principal monomer under polyacetal copolymerization conditions.

2. The process of claim 1, wherein said copolymerization catalyst includes at least one heteropoly-acid selected from the group consisting of phosphomolybdic acid, silicomolybdic acid, silicotungstic acid, phosphotungstic acid, and acid salts thereof.

3. The process of claim 1, wherein said comonomer is at least one member selected from the group consisting of dioxolane, diethylene glycol formal and 1,4-butanediol formal.

4. The process of claim 1, wherein said copolymerization catalyst is present in an amount between 0.1 to 50 ppm, based on the total weight of the monomers.

\* \* \* \* \*